(12) United States Patent
Johnson

(10) Patent No.: US 6,497,530 B1
(45) Date of Patent: Dec. 24, 2002

(54) UNIVERSAL FLANGE JOINT FOR ATTACHING

(75) Inventor: Gary Johnson, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/479,106

(22) Filed: Jan. 7, 2000

(51) Int. Cl.⁷ .................................................. F16D 1/00
(52) U.S. Cl. ...................... 403/335; 403/337; 403/168; 244/158 R; 244/904
(58) Field of Search .......................... 102/377; 285/405; 244/158 R, 904, 1 R; 403/335, 336, 337, 208, 188, 190, 396, 3, 4, 191, 187, 217, 167, 168, 362, 171, 174

(56) References Cited

U.S. PATENT DOCUMENTS

| | | | | |
|---|---|---|---|---|
| 2,052,600 A | * | 9/1936 | Boss | 403/362 X |
| 3,901,613 A | * | 8/1975 | Andersson | 403/171 X |
| 4,131,380 A | * | 12/1978 | De Bliquy | 403/217 |
| 4,326,354 A | * | 4/1982 | Hagberg | 403/263 X |
| 4,484,430 A | * | 11/1984 | Rossman | 403/174 X |
| 5,230,491 A | * | 7/1993 | Tseng | 403/217 X |
| 5,271,685 A | * | 12/1993 | Stark | 403/171 |
| 5,566,516 A | * | 10/1996 | Beaulieu | 403/171 X |

* cited by examiner

Primary Examiner—Lynne H. Browne
Assistant Examiner—John R. Cottingham
(74) Attorney, Agent, or Firm—Colin M. Raufer; Leonard A. Alkov; Glenn H. Lenzen, Jr.

(57) ABSTRACT

The present invention related to a universal joint assembly for attaching two missile sections together wherein one section is a recycled rocket motor. The joint assembly includes a plurality of attachment blocks each secured through fasteners to the outer surface of the rocket casing. Separate fasteners are employed between the attachment blocks and the adjacent section. As the fasteners are advanced, the attachment blocks are first secured to the rocket casing and then the attachment blocks are drawn toward the adjacent section until the sections are abutting one another. The attachment blocks do not abut the adjacent section.

19 Claims, 4 Drawing Sheets

UNIVERSAL FLANGE JOINT FOR ATTACHING

BACKGROUND OF THE INVENTION

1. Field of the Invention

The present invention relates to a new and improved joint for attaching adjacently disposed missile sections together. More specifically, the present invention relates to a unique flange joint assembly adaptable for joining the cylindrical casing of a recycled rocket motor section to an adjacent section by utilizing a number of unique attachment blocks mounted on the rocket casing and bolted to the adjacent missile section.

2. Description of the Related Art

In an effort to contain missile manufacturing costs while maintaining the required level of performance and quality, it would be useful to be able to recycle certain existing missile components. For example, in manufacturing the AIM-9X tactical missile, it would be highly desirable to utilize existing rocket motor assemblies along side newly manufactured control actuator section (CAS).

Typically, when manufacturing an entirely new missile assembly, adjacent sections are attached to one another by a series of conventional fasteners such as radial screws or bolts. The machining process for creating the tight tolerance countersunk through holes in the rocket motor housing necessary to receive the screws or bolts requires drilling a large number of holes having relatively high tolerances. Relaxing the tolerances could lead to larger hole clearances, creating "loose joints". Because a newly manufactured rocket assembly has not yet been filled with "live propellant," the manufacturing process is not considered to be dangerous.

However, when recycling existing rocket motor assemblies, certain factors need be considered. In particular, the need for a large number of conventional radial screw holes to achieve rigid attachment can be a dangerous undertaking when the rocket housing contains "live propellant." In addition, conventional radial screw joints have been found lacking in both strength and stiffness. If the tolerances for the radial screw joints are not maintained, joint failure could occur during missile operation. Finally, it has proven difficult to properly seal such radial screw joints.

It is clear that there exists a need in the art for a universal joint assembly that can be utilized when attaching adjacent missile sections together. The joint should be easy to assemble, provide the strongest possible attachment while ensuring that attached missile sections remain in abutment during flight of the missile. Such a universal joint should avoid the need for relatively high tolerances and should be capable of easy sealing. As will become apparent, the present invention meets all of these requirements in a unique and efficient universal joint assembly.

SUMMARY OF THE INVENTION

This need in the art for utilizing recycling existing rocket motors when manufacturing new missiles assemblies is possible because of the unique, universal joint assembly of the present invention. The universal joint of the present invention includes a plurality of separate attachment blocks. To prevent disruption of the stream of air flowing past the missile during flight operation, the attachment blocks may be aligned with existing fairings extending axially along the surface of the missile. The AIM-9X, for example, has four such external fairings and would therefore utilize four (4) attachment blocks when joining a recycled rocket motor an adjacent CAS. When four fairings are present, the fairings and the four attachment blocks are positioned about the missile circumference at approximately 90° intervals to one another.

Each attachment block has blind bore holes aligned with through holes extending completely through the outer casing of the rocket motor. Bolts or screws extending through the rocket casing and into the attachment blocks may be selectively adjusted to tighten the attachment blocks to the casing outer surface. When mounted on the rocket casing, the attachment blocks function in a manner similar to flanges. Because the rocket motor casing is joined only to the attachment blocks, the holes machined in the rocket casing do not require the higher tolerances necessary were the rocket casing to be screwed or bolted directly to the CAS.

Additional holes are machined in a substantially axial direction completely through each attachment block. The additional holes are aligned with blind bore holes machined in the end face of the CAS. When assembled, axial screws extend though the attachment block and into blind bore holes. As the axial screws are tightened, they pull the attachment blocks and connected rocket motor casing toward the CAS until the aft face of the rocket casing abuts the flat forward face of the CAS. The attachment blocks are formed such that as the cylindrical surfaces of the rocket casing and CAS make surface contact, none of the attachment blocks contacts the CAS.

Each attachment block replaces only a portion of a fairing extending along the outer surface of the rocket casing. The attachment blocks are specifically designed to have no aerodynamic envelope impact. Preferably, the attachment blocks are positioned onto an aft section of the rocket motor casing at a location between the ortman key slot and the aft end of the casing.

While the present invention employs four attachment blocks for use in manufacturing an AIM-9X missile including four fairings, it is within the scope of the present invention to have any number of such attachment blocks depending only on the number of fairings/fins extending along the outer surface of the missile. Likewise, while the preferred embodiment employs two screws or bolts to join each attachment block to the CAS and two additional screws or bolts to mount each attachment block on the rocket casing, any number of screws, bolts or other fasteners may be employed depending on the size of the missile and attachment blocks.

DESCRIPTION OF THE INVENTION

Figure 2:
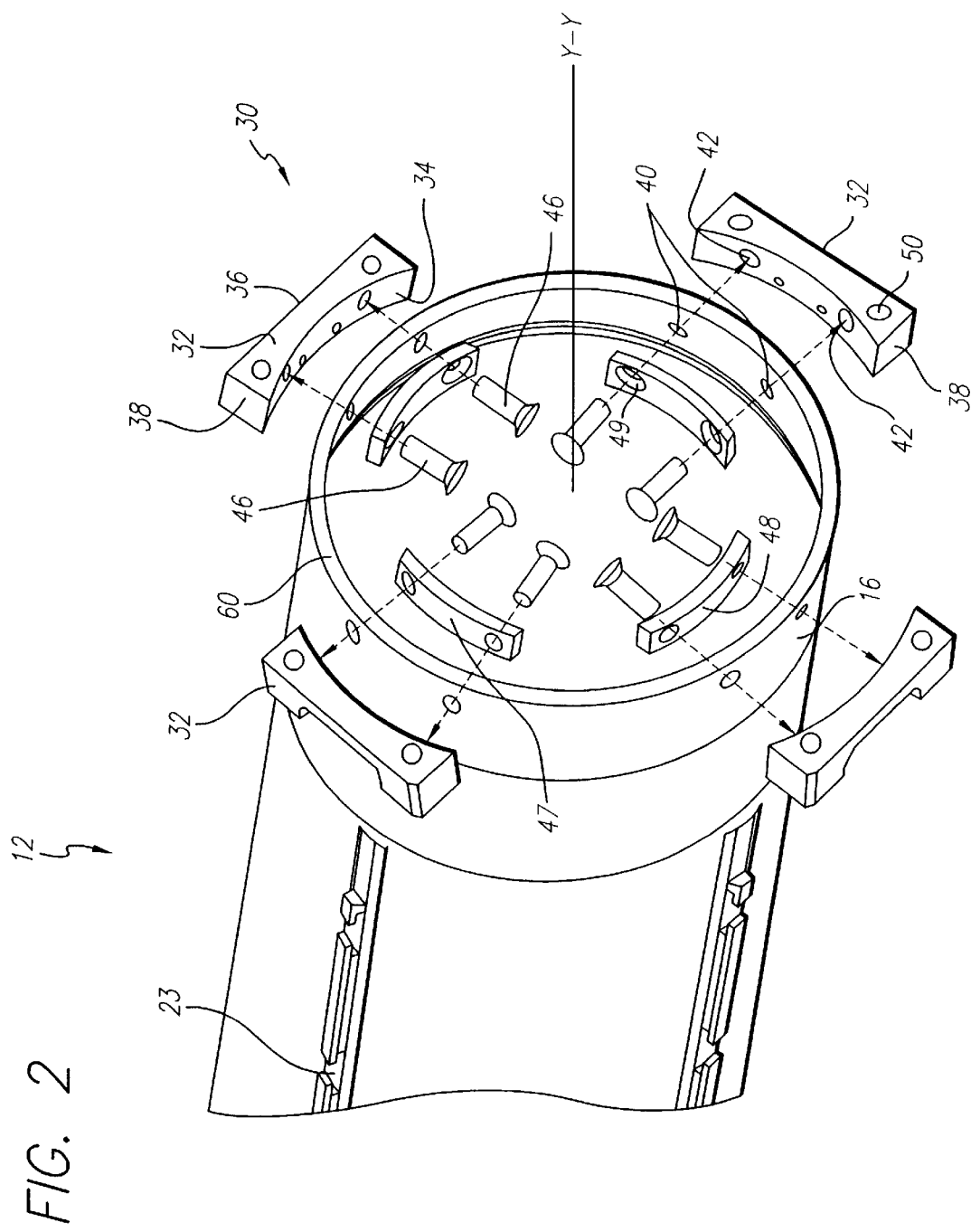
FIG. 2 a perspective view of the rocket motor section of FIG. 1 showing an exploded view of the universal joint of the present invention.
Figure 4:
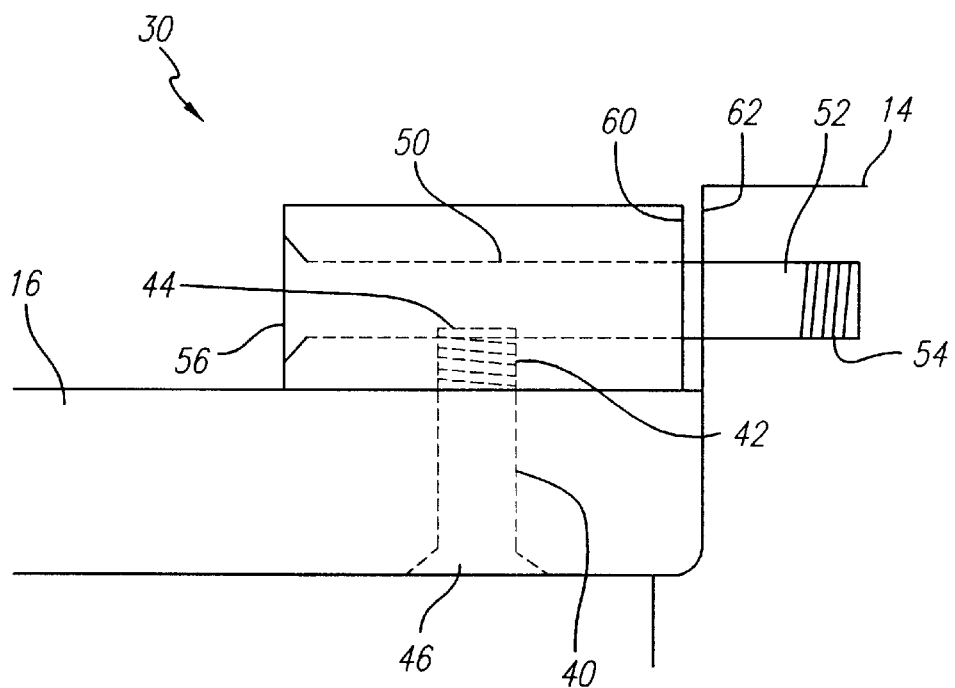
FIG. 4 is a cross-sectional view of the embodiment of FIG. 1 showing the universal joint of the present invention.

Illustrative embodiments and exemplary applications are described below with reference to the accompanying drawings in order to disclose the advantageous teachings of the present invention. Referring now to the drawings wherein like reference numerals designate like elements throughout, a missile assembly generally shown at 10, includes a rocket motor section 12 and a control actuator section or CAS 14. As best shown in FIGS. 2 and 4, rocket motor section 12 includes a cylindrically-shaped, hollow aft casing 16 having an end surface facing CAS 14.

Turning again to FIG. 1, missile assembly 10 further includes a number of fairings 22, with several such fairings shown. An additional rocket casing fairing which would normally appear in FIG. 1 has been deleted to better show the joint assembly comprising the present invention. Each fairing 22 extends in a direction parallel to the longitudinal axis Y—Y of missile assembly 10. Each of the fairings 22 straddles two fairing mounting pads 23 and is selectively secured to pads 23 via fasteners 24. In a similar manner, certain axial fairings 22 are mounted on the attachment blocks via fasteners 70. The fairings 22 are axially aligned with one another to form a plurality of fairing assemblies extending along the outer surface of the missile assembly 10 in a direction substantially parallel to the longitudinal missile axis Y—Y and circumferentially spaced from one another by substantially ninety degrees (90°) in a four (4) block attachment system.

As will be described below, the universal joint assembly 30 of the present invention serves to securely attach aft casing 16 of rocket section 12 to CAS 14. Universal joint assembly 30 includes a plurality of similarity-shaped attachment blocks 32. Preferably, attachment blocks 32 are formed of steel. Alternatively, attachment blocks 32 may be formed of a steel alloy as well as various strong, but light in weight metals utilized in space age weapon systems such as titanium. Each attachment block 32 has an inner, curved surface 34 and an outer surface 36 having a shape complimentary to the outer surface of fairings 22 and CAS 14.

When assembled, attachment blocks 32 are mounted on casing 16 and disposed between fairings 22 and CAS 14 and, along with the fairings and outer surface of CAS 14, form a continuous stream line configuration. Each attachment block 32 has a pair of substantially parallel extending side wall portions 38 joining inner and outer surfaces 34 and 36, respectively. As shown in the embodiment of FIG. 2, the inner surface 34 of attachment block 32 has the same curvature as the outer surface of aft casing 16. This assures that inner surface 34 makes smooth, surface contact with the outer surface of aft casing 16 when attachment block 32 is assembled on casing 16 as will be explained.

Referring to FIGS. 2, a plurality of through holes 40 are shown extending in a substantially radial direction completely through aft casing 16. Aligned with through holes 40 are a plurality of blind bore holes 42, each extending partially through block 32 from inner surface 34 toward outer surface 36 as best shown in FIG. 4. Each bore hole 42 preferably includes a threaded locking insert 44 adaptable for receiving a fastener as identified at 46. A plurality of backing plates 47 having outer surfaces 48 curved in a manner similar to the inner surface of aft casing 16 are positioned within casing 16 at positions opposite attachment blocks 32. Each backing plate 47 has a pair of countersunk through holes 49 aligned with through holes 40 in casing 16.

When assembled, a separate fastener 46 is caused to advance through aligned through holes 49 and 40 in backing plate 47 and aft casing 16, respectively, and into blind bore hole 42 in attachment block 32. Each fastener 46 is advanced until it can no longer move and is secured within block 32 by engagement to threaded locking insert 44. As the fasteners 46 extending within a particular block 32 are tightened, attachment block 32 and backing plate 47 are drawn into clamping contact with aft rocket aft casing 16. In effect, attachment block 32 has become a flange-like member mounted on casing 16 and extending toward CAS 14. Fasteners 46 take the form of screws, bolts or any well known fastening members.

As shown in FIG. 4, a through hole 50 extends completely through attachment block 32 in a direction substantially parallel to the longitudinal axis Y—Y of missile assembly 10. As shown in FIG. 2, a pair of through holes 50 are each spaced substantially the same distance from inner surface 34 of attachment block 32 and are preferably located such that bore holes 42 are located between through holes 50. As shown in FIG. 4, for each attachment block, a pair of parallel-extending blind bore holes 52 are machined into the CAS 14. Each pair of bore holes 52 is aligned with the pair of through holes 50 in attachment block 32 when block 32 is attached to the outer surface of aft casing 16. Threaded locking inserts 54 may be positioned in each of the bore holes 50. A pair of fasteners 56 are advanced through holes 50 until they enter bore holes 52. Fasteners 56 are further advanced until they engage and are retained in place by inserts 54 located in the ends of bore holes 52. Advancement of fasteners 56 serves to draw the aft surface 60 of rocket casing 16 into abutting contact with the forward surface 62 of CAS 14.

Joint assembly 30 is designed such that when confronting surfaces 60 and 62 of casing 16 and CAS 14, respectively, achieve abutting contact with one another, attachment blocks 32 do not touch CAS 14. This insures that attachment blocks 32 will not prevent surface contact between rocket section 12 and CAS 14 from being achieved. When each attachment block 32 is fixedly mounted on rocket casing 16 by fasteners 46 and secured to CAS 14 by fasteners 56, the attachment blocks 32 serve as flange joints between the adjacent sections of missile assembly 10. Fasteners 56 may take the form of screws, bolts or any well known fastening members.

Figure 1:
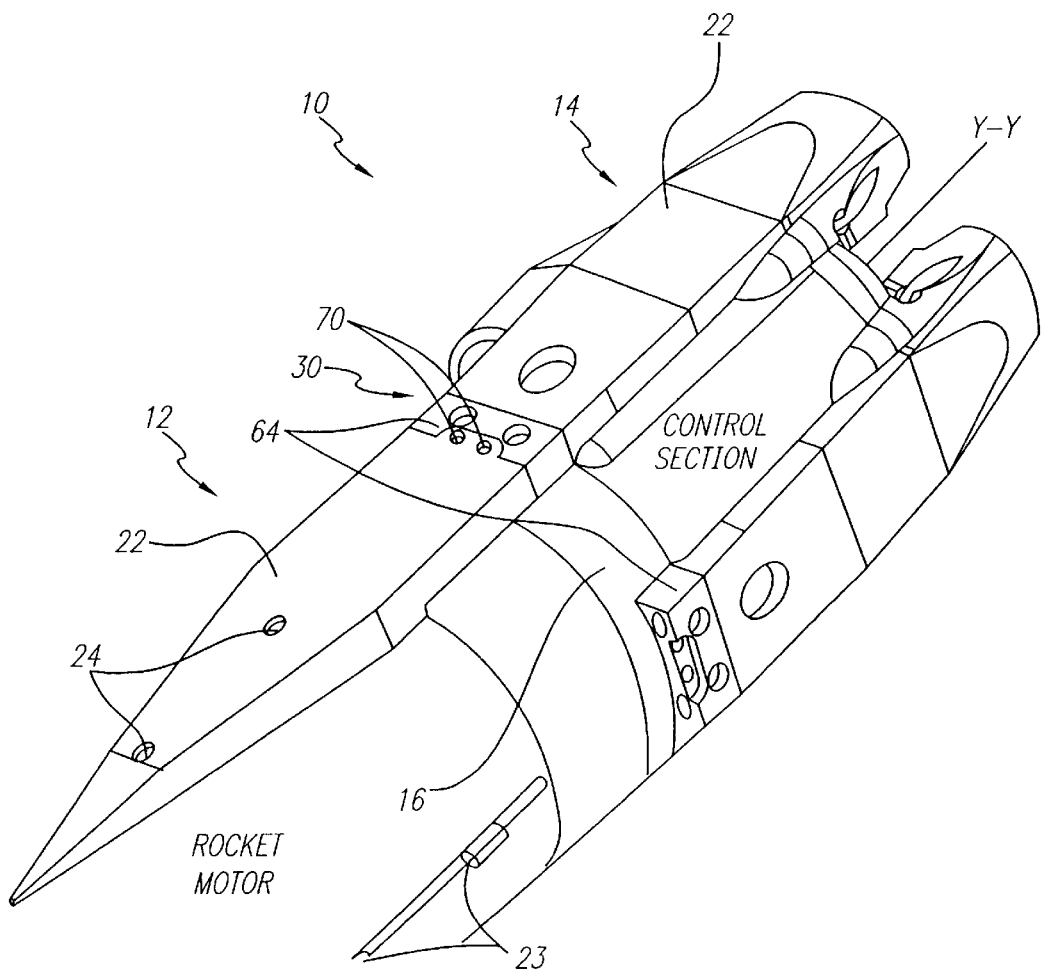
FIG. 1 is a perspective view of rocket motor and adjacent CAS sections of a missile assembly employing a universal joint assembly formed in accordance with the present invention.
Figure 3:
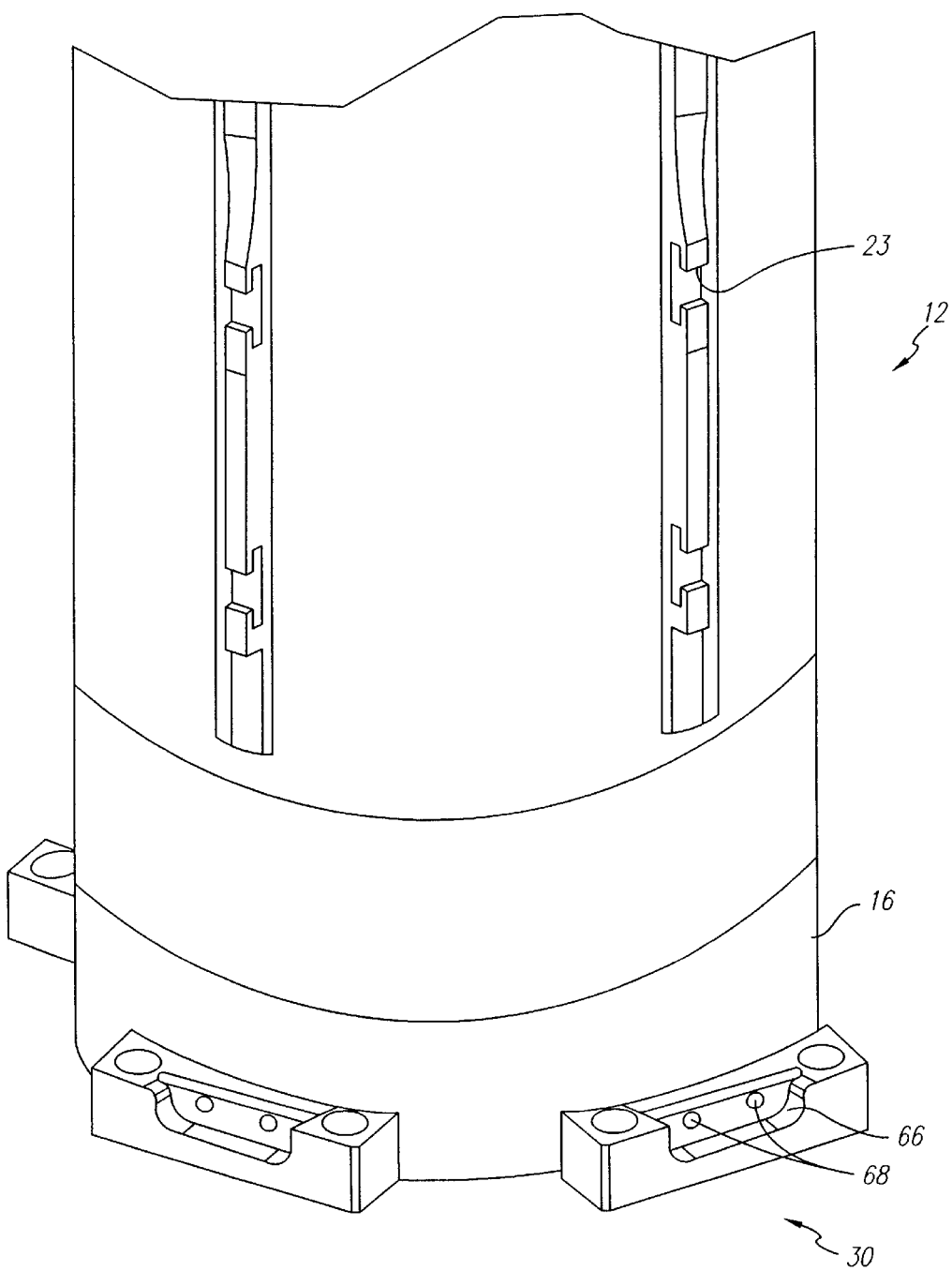
FIG. 3 is a side view of the rocket motor section of FIG. 1 including the universal joint of the present invention.

Each fairing 22 mounted on casing 16 is formed with a protruding end member or tongue 64 mounted on an end surface and extending toward CAS 14. As shown in FIGS. 1 and 3, each attachment block 32 is formed with a cut out section 66 of similar size and shape to protruding end member 64. A pair of bore holes 68 extend through a portion of attachment block 32 from a surface of cut out section 66. A further pair of through holes 70 extend completely through protruding member 64 and are aligned with holes 68 when protruding member 64 is seated within cut out 66. A pair of fasteners, not shown, extend completely through holes 70 and into bore holes 68. These fasteners, not shown, serve to tighten fairings 22 into position relative to aft casing 16.

In the preferred embodiment of the present invention, fasteners extend through the aft casing 16 in a radially outwardly direction until entering the bore holes formed in the attachment blocks 32. It is considered within the scope of the present invention for the fasteners to extend in a radially inwardly direction through both the attachment blocks and the aft casing, with securing members tightening the fasteners against release.

Thus, the present invention has been described herein with reference to a particular embodiment for a particular application. Those having ordinary skill in the art and access to the present teachings will recognize additional modifications, applications and embodiments are within the scope thereof. Although the invention has been shown as being applicable to recycling a rocket motor 12 for use in a new AIM-9X missile, it is in no way limited to this application.

Basically, when assembling two adjacent missile sections where there is need to maximize the strength of the joint, the universal joint assembly of the present invention may be employed. Likewise, the joint assembly of the present invention may be utilized when it is necessary to secure two sections of a structure in abutting contact without the need for drilling a large number of high tolerance holes in either section.

It is therefore intended by the appended claims to cover any and all such applications, modifications and embodiments within the scope of the present invention.

Accordingly,

What is claimed is:

1. An improved universal joint assembly for fixedly attaching first and second sections for joint movement, said first and second sections each having at least one attachment hole extending in different directions from one another and said assembly comprising:
   at least one attachment block adapted to be mounted on either one of said first or said second sections, each attachment block having at least two holes extending in different directions, with one of the holes aligned with the attachment hole in the first section and the other hole aligned with attachment hole in the second and
   a plurality of fasteners, with at least one fastener extending through at least a portion of the attachment block and at least a portion of the first section and at least one other fastener extending through at least a portion of the attachment block and at least a portion of the second section;
   whereby at least one of the fasteners serves to draw each of said attachment blocks into tight contact with said first or said second sections and said other fastener serves to draw the combination of attachment block and said one of said first or second sections toward the other of said first or said second sections until said first and second sections are joined together in abutting surface contact.

2. The joint assembly of claim 1 wherein each attachment block is mounted on one of the two sections and includes two pairs of openings for receiving a separate pair of fastener extending between each section and the attachment block.

3. The joint assembly of claim 1 wherein each attachment block is mounted on the exterior surface of the first section at a position adjacent and end surface of the first section.

4. An improved missile assembly including a universal joint assembly attaching a rocket motor section to an adjacent control actuator section, comprising:
   said rocket motor section having an aft casing including a plurality of holes, with each extending at least partially through the aft casing in a direction substantially perpendicular to the longitudinal axis of the missile assembly;
   said control actuator section including a plurality of holes, with each hole extending partially within the control section in a direction substantially parallel to the longitudinal axis of the missile system;
   a plurality of separate attachment blocks mounted on the aft casing, with each attachment block having at least one hole aligned with one of the perpendicular holes extending through the aft casing and each attachment block having at least one further hole aligned with one of the parallel hole extending within the control section; and
   attachment means within the aligned holes of the aft casing and attachment blocks for drawing each attachment block into tight contact with the aft casing and further attachment means within the aligned holes of the attachment blocks and the control section for drawing each attachment block toward the control section until a rear surface of the aft casing abuts a front surface of the control section.

5. The improved missile assembly of claim 4 wherein each of the plurality of perpendicular holes extends completely through the aft casing and is aligned with a perpendicular bore hole extending partially through one of the attachment blocks.

6. The improved missile assembly of claim 4 wherein each attachment block as a pair of holes extending completely therethrough in a direction parallel to the longitudinal axis of the missile assembly.

7. The improved missile assembly of claim 6 wherein the control section has a pair of bore holes aligned with the parallel holes extending through each attachment block.

8. The improved missile assembly of claim 4 wherein the attachment block has an inner surface of the same curved configuration as the outer surface of the aft casing.

9. The improved missile assembly of claim 4 wherein the missile assembly has a plurality of fairings extending along the surface of the missile assembly with each attachment block being aligned with one of said fairings to prevent the attachment blocks from causing any aerodynamic envelope impact.

10. The improved missile assembly of claim 4 wherein said attachment means comprises a plurality of radial screws, with a separate screw positioned within each of said aligned openings in said aft casing and said attachment blocks and said control sections.

11. The improved missile assembly of claim 4 wherein said attachment means comprises a plurality of bolts, with a separate bolt positioned within each of said aligned openings in said aft casing and said attachment blocks and said control sections.

12. An improved joint assembly for attaching a recycled rocket motor housing to a control actuator section, comprising:
   a plurality of separate attachment blocks, each block having an inner curved surface similar in shape to an outer surface of a rocket motor casing and each attachment block having a pair of radially extending bore holes aligned with a pair of holes extending completely through an aft casing, with a pair of holes extending in a longitudinal direction completely through each attachment block and aligned with a pair of bore holes formed in the control section and
   a plurality of fasteners, with a separate fastener extending through each pair of aligned holes in the aft casing, attachment block and control sections, whereby a first pair of fasteners draws each attachment block toward the aft casing and a second pair of fasteners draws each attachment block and the aft casing toward the control section until an aft surface of the casing abuts a front surface of the control section.

13. The improved joint assembly according to claim 12 wherein each attachment block is aligned with a fairing assembly extending in a longitudinal direction along the missile surface, with a portion of the fairing assembly positioned forward of each attachment block and a remaining portion of the fairing of the fairing assembly mounted aft of each attachment block.

14. The improved joint assembly according to claim 13 wherein each attachment block has an outer surface similar in size and configuration to an outer surface of the fairing assembly positioned on each side of each attachment block.

15. The improved joint assembly according to claim 12 wherein each of said plurality of fasteners comprises a radial screw.

16. The improved joint assembly according to claim 12 wherein each of said plurality of fasteners comprises a threaded bolt.

17. The improved joint assembly according to claim 12 wherein the bore holes in the attachment block and control section each include a locking threaded insert for securely locking the fastener against inadvertent separation.

18. A method of joining two missile sections to one another, comprising the following steps:

positioning a plurality of separate attachment blocks adjacent an outer surface of a rocket aft casing;

machining a pair of holes completely through the aft casing in a direction substantially perpendicular to the longitudinal axis of the sections and partially into each attachment block;

machining a further pair of holes completely through each attachment block in a direction substantially parallel to the longitudinal axis of the sections and partially into a control section;

first advancing a separate fastener into each pair of aligned holes in the casing and each attachment block for securing each attachment block into surface contact with the aft casing; and second advancing a separate fastener into each pair of aligned holes in each attachment block and the control section for drawing the aft casing into abutting contact with the control section.

19. A method of forming a joint according to claim 18 including the step of retaining separation between each attachment block and the control section as the aft casing contacts the control section.

* * * * *

UNITED STATES PATENT AND TRADEMARK OFFICE
CERTIFICATE OF CORRECTION

PATENT NO. : 6,497,530 B1
DATED : December 24, 2002
INVENTOR(S) : Gary Johnson

It is certified that error appears in the above-identified patent and that said Letters Patent is hereby corrected as shown below:

Column 1,
Below the title, please insert -- This invention was made with Government support under Contract No. N00019-97-C-0027 awarded by the Department of the Navy. The Government has certain rights in this invention. --.

Signed and Sealed this

Fourteenth Day of October, 2003

JAMES E. ROGAN
*Director of the United States Patent and Trademark Office*